United States Patent

Cheng et al.

[15] 3,657,480

[45] Apr. 18, 1972

[54] MULTI CHANNEL AUDIO SYSTEM WITH CROSSOVER NETWORK FEEDING SEPARATE AMPLIFIERS FOR EACH CHANNEL WITH DIRECT COUPLING TO LOW FREQUENCY LOUDSPEAKER

[72] Inventors: Theodore Cheng, 1209 W. Wynnewood Road, Wynnewood, Pa. 19096; James J. Hitt, 73 New Street, Willow Grove, Pa. 19090

[22] Filed: Aug. 22, 1969

[21] Appl. No.: 852,221

[52] U.S. Cl. ....................179/1 D

[51] Int. Cl. ....................H03g 5/00, H03h 7/06

[58] Field of Search ....................179/1 D; 333/70 CR

[56] References Cited

UNITED STATES PATENTS 2,093,076 9/1937 Engle....................179/1 D 2,148,994 2/1939 Menerich....................179/1 D 2,474,191 6/1949 Reid et al....................179/1 D

*Primary Examiner*—Kathleen H. Claffy

*Assistant Examiner*—Douglas W. Olms

*Attorney*—William G. Miller, Jr.

[57] ABSTRACT

An audio system in which the audio signal is divided into two or three adjacent frequency ranges by a frequency dividing network having complementary frequency characteristics in the overlapping frequency region and the relative gain of the channels is adjusted for tone control purposes. Each frequency range is amplified by a separate amplifier channel. The output of each amplifier is directly connected to a separate loudspeaker. The low frequency amplifier is a direct coupled amplifier having no reactive elements in its signal path and its output is directly coupled to its associated loudspeaker so that no reactive elements are interposed between the amplifier output and the loudspeaker voice coil.

9 Claims, 4 Drawing Figures

MULTI CHANNEL AUDIO SYSTEM WITH CROSSOVER NETWORK FEEDING SEPARATE AMPLIFIERS FOR EACH CHANNEL WITH DIRECT COUPLING TO LOW FREQUENCY LOUDSPEAKER

BACKGROUND OF THE INVENTION

This invention relates to audio frequency systems of the type which uses a plurality of loudspeakers for producing from audio signals the full frequency range of sound waves with the highest possible degree of fidelity. More specifically, this invention relates to multichannel loudspeaker systems in which two or three separate amplifying channels are provided. This invention also relates to inexpensive low level signal frequency dividing networks for accomplishing the required frequency division with a complementary frequency characteristic in the overlapping frequency region.

Multichannel audio frequency systems such as reproduction systems usually utilize a preamplifier to provide the initial amplification and frequency equalization for audio frequency signals put out by the transducer being used for reproduction. The preamplifier also serves the function of providing any desired tone control. In the past, the preamplifier was usually followed by a single power amplifier which had its output connected to a frequency dividing crossover network, known in the art simply as a crossover network. This crossover network separated the high power level audio signals into separate component signals in adjacent frequency ranges in accordance with the requirements of each of the several loudspeakers for a particular range of frequencies. A description of typical crossover networks and their function is set forth in "Hi-Fi Crossover Networks" by Abraham B. Cohen and Paul D. Cohen in the 1960 edition of Hi Fi Annual & Audio Handbook.

Characteristically, prior art crossover networks were located between the output of the power amplifier and the loudspeakers and designed so that the combined impedances of the network and the loudspeakers presented a substantially constant impedance load to the power amplifier and so that the signals to the separate loudspeakers resulted in the production of a substantially constant sound power level over the entire frequency range for a particular input level. This objective was seldom realized because of the compromises necessary in designing such a network for relatively high power levels and low impedance levels of 8 or 16 ohms while preventing excessive power losses before those signals reached their respective loudspeaker voice coils. These crossover networks usually utilized expensive inductors having a large air gap to reduce electrical resonant peaks characteristic of reactive networks involving inductances and capacitances. Also, it has been found that these crossover networks were responsible for various subtle forms of high frequency distortion as well as poor electrical damping of the low frequency loudspeaker.

It is therefore an object of this invention to provide an audio system which will eliminate expensive components and minimize distortion while covering a wide frequency range.

It is further an object of this invention to provide a multichannel audio system which will eliminate distortion due to interaction of the loudspeaker with the circuit driving it.

BRIEF DESCRIPTION OF THE INVENTION

In carrying out the invention an audio frequency signal is divided into separate component signals by a frequency dividing crossover network. The component signals are in adjacent frequency ranges and have complementary frequency characteristics in the overlapping frequency regions. A loudspeaker is provided for each of the component signals. There is also provided means for connecting each of the component signals produced by the crossover network to a corresponding loudspeaker with the connecting means connecting the low frequency component to the low frequency loudspeaker including an amplifier having a nonreactive output circuit connected directly to the low frequency loudspeaker.

BRIEF DESCRIPTION OF THE DRAWINGS

The preferred embodiments of the invention are shown in the following drawings in which like elements are identified by like reference characters.

DESCRIPTION OF THE PREFERRED EMBODIMENTS

Figure 1:
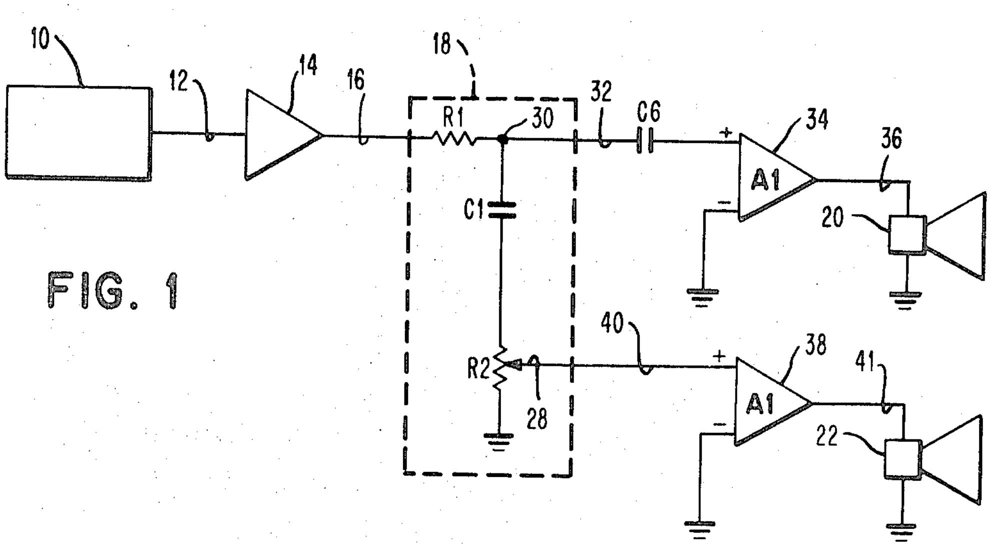
FIG. 1 is a circuit diagram of one form of the invention for a two channel system.

Referring to FIG. 1, the transducer 10 converts a signal such as the mechanical motion of a phonograph needle to an electrical signal whose wave shape represents the audio signal to be reproduced as sound waves. The transducer 10 is connected by line 12 to preamplifier 14 for amplification from the low level found at the output of the transducer to a level useful as an input for power amplification. The preamplifier usually incorporates any circuits which may be necessary for modifying the transducer output to compensate for characteristics of the transducer and the recorded material from which the transducer is receiving its input. Also, any necessary tone controls are usually incorporated in the preamplifier.

The preamplifier 14 is connected by line 16 to a frequency dividing crossover network, usually known in the art simply as a crossover network and shown in FIG. 1 within the dashed block 18. Since the reproduction system of FIG. 1 is a two channel system using only two loudspeakers, it is only necessary for the frequency dividing network to divide the signal on line 16 into two component signals in adjacent frequency ranges—a low range to supply the low frequency loudspeaker 20 and a high range to supply the high frequency loudspeaker 22. This frequency division is carried out by a series circuit consisting of resistor R1, capacitor C1, and resistor R2 with its variable tap 28. This series circuit is connected between line 16 and ground as shown in FIG. 1.

The combination of resistor R1 and capacitor C1 causes the low frequency portion of the signal supplied from line 16 to be supplied on line 32 to the power amplifier 34 by way of a d.c. blocking capacitor C6. In amplifier 34 the low frequency portion of the signal is amplified sufficiently to produce the power needed to drive the low frequency loudspeaker 20. The connection from amplifier 34 is through line 36 to one terminal of loudspeaker 20 and from the other terminal of loudspeaker 20 to ground.

The higher frequencies in the signal on line 16 are shunted across the input amplifier 34 by the combination of capacitor C1 and resistor R2 so that a portion of the potential drop across resistor R2, as picked off by tap 28, provides the input signal for high frequency power amplifier 38 by way of connection 40. Contact 28 is adjusted to give an acoustic output from the high frequency loudspeaker which will balance that from the low frequency loudspeaker. The low frequency loudspeaker normally requires a much greater driving power than the high frequency loudspeaker because of the greater efficiency of the latter.

Amplifier 38 supplies the power to drive the high frequency loudspeaker 22. The connection of the output of amplifier 38 to one terminal of its associated loudspeaker 22 is by way of line 41 with the other terminal of loudspeaker 22 being connected to ground.

The values for the elements of the frequency dividing network are, of course, chosen in accordance with the desired overlapping frequency region. For example, to obtain an overlapping frequency region centered around a nominal 800 hz frequency the values for the elements may be R1 = 47,000 ohms, C1 = 0.005 microfarads, and R2 = 4,700 ohms. The blocking capacitor may have a value of 1.0 microfarad.

Figure 3:
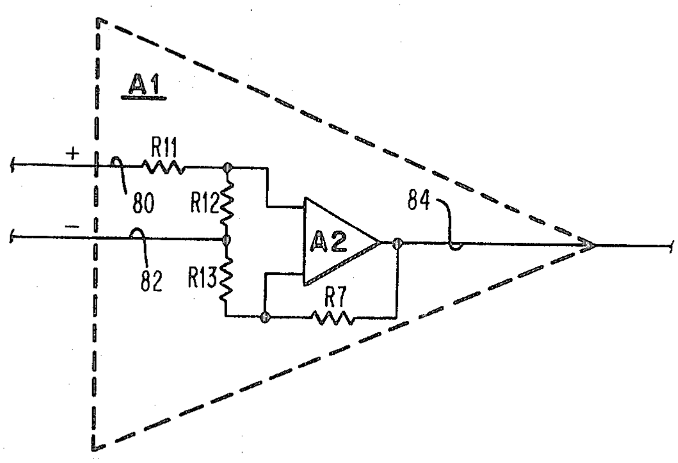
FIG. 3 is a circuit for the power amplifier of FIG. 1.
Figure 4:
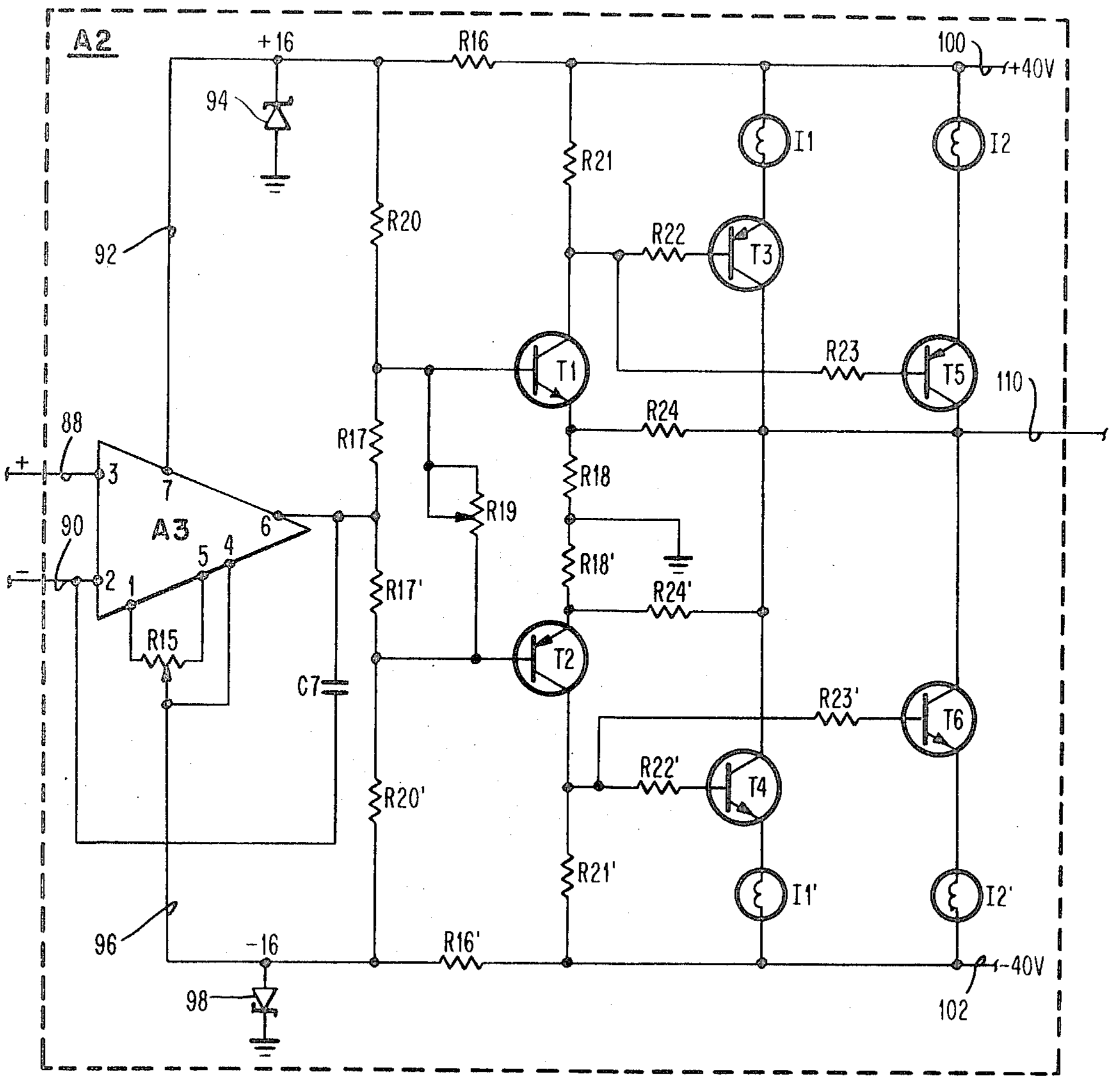
FIG. 4 is a circuit for the power amplifier of FIG. 2.

The amplifiers 34 and 38 are noted as being amplifiers of the type A1. A preferred circuit for an amplifier of this type is shown in FIG. 3 and 4 taken together. As will be described subsequently, the amplifiers are differential amplifiers of the direct coupled type.

For the purposes of this invention a direct coupled amplifier may be defined as an amplifier capable of amplifying d.c. signals and signals in the audio spectrum including the normal harmonic content.

As will be subsequently described, the circuit of amplifiers 34 and 38 have a low impedance output and do not have any reactive elements in their output circuits. Likewise, since the amplifiers 34 and 38 are directly connected to their respective loudspeakers the connections do not include any reactive elements.

With an arrangement such as shown and described for FIG. 1, the audio signals being reproduced will be followed closely by the respective loudspeaker cone excursions. The low impedance of the output circuit of the power amplifier is achieved by voltage feedback, in the absence of any reactive element and will provide a high degree of electrical damping of the counter e.m.f. generated by the motion of the loudspeaker voice coil in a strong magnetic field. Thus, the low frequency musical notes particularly are reproduced clearly and distinctly.

If a maximum fidelity reproduction is not required, high frequency amplifier 38 can be any conventional amplifier of good design. It is only necessary that the low frequency amplifier 34 not have reactive elements in its output circuit.

In FIG. 1 it will be noted that the inputs to the differential amplifiers 34 and 38 is at their non-inverting inputs and that their inverting inputs are used for logical negative feedback. Thus, the input signal is applied to only one input of the differential amplifiers. It would, of course, be possible to utilize other types of amplifiers not having circuitry of the differential type. The important factor is that at least the output stage and the output connections of amplifier 34 should be non-reactive.

In systems such as that shown in FIG. 1, it is preferable that lines 36 and 41 should be as short as possible to minimize the impedance which the loudspeakers see looking back into their respective power amplifiers. This may call for the crossover network and the amplifiers to be mounted on the loudspeaker enclosures, for example. Therefore, it is possible that the line 16 would be long enough so that its capacitance if combined with a high output impedance of preamplifier 14, would require that there be added to the preamplifier a low output impedance stage, such as an emitter follower. Such an arrangement avoids any unnecessary attenuation of the very high frequencies when line 16 is long.

The attenuation provided by the frequency dividing network in FIG. 1 will be 6 db per octave for both frequency ranges in the overlapping region. That amount of attenuation has been found to be quite adequate for the highest quality loudspeaker systems.

Figure 2:
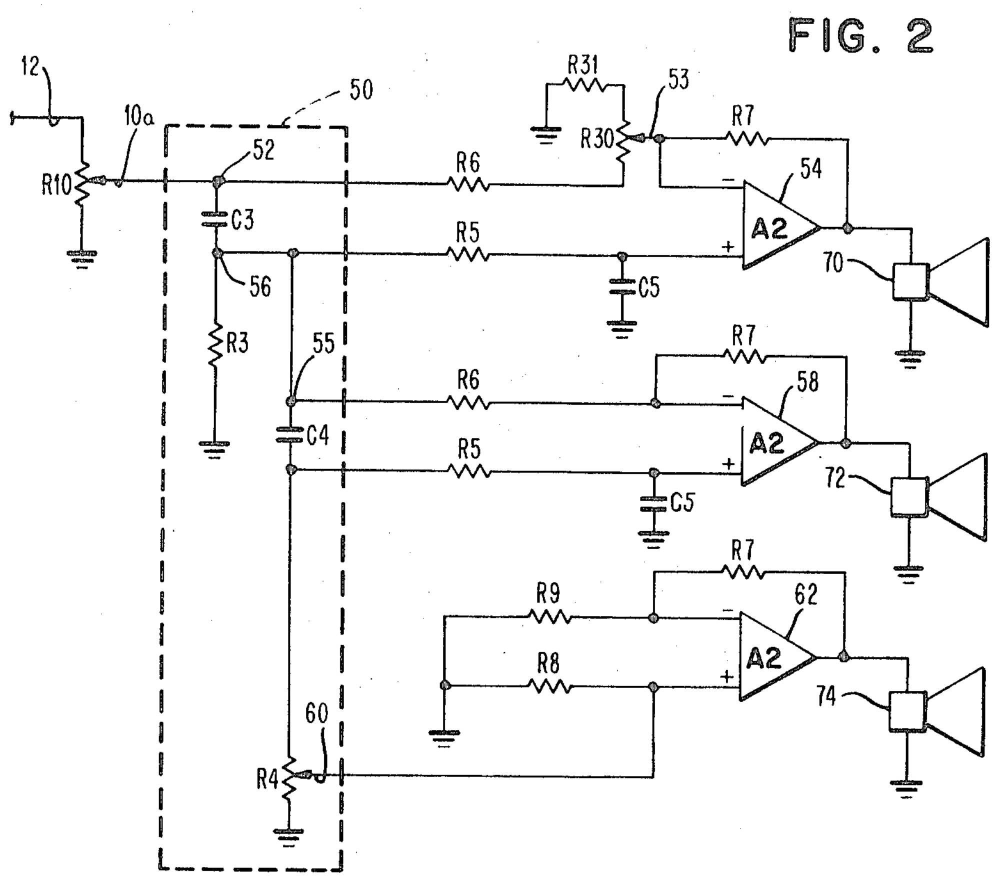
FIG. 2 is a circuit diagram of a preferred form of the invention for a three channel system.

When three loudspeakers are used for the reproduction process as in a three channel loudspeaker system, a circuit such as that of FIG. 2 will provide the same benefits as those derived from the circuit of FIG. 1 for the two channel system.

In FIG. 2, the output signal from the transducer is supplied on line 12 to one end of resistor R10 and the signal from the gain adjusting tap 10*a* of resistor R10 supplies the three channel frequency dividing network shown in dashed block 50. This low level frequency dividing network consists of a cascaded pair of series circuits adapted to audio signal levels of about 1 volt. The first series circuit includes capacitor C3 and resistor R3 which connect from the signal input at tap 10*a* and junction 52 to ground.

The capacitor C3 is of a value such that it is a low impedance to frequencies above the low frequency range. Since the impedance across C3 is highest at the lowest frequencies the potential across C3 is utilized as the potential between the two differential inputs to the low frequency power amplifier 54.

The second series circuit in the frequency dividing network 50 includes capacitor C4 and resistor R4 which connects from the junction 56, between R3 and C3, to ground. The capacitor C4 is sized to provide a low impedance to the frequencies which are in the highest frequency range. Thus the potentials at opposite sides of capacitor C4 provide the differential inputs to the midrange power amplifier 58.

Since the capacitor C3 shunts all the lowest frequencies through resistor R3 to ground, the potential between junction 55 (connected to junction 56) and ground provides the potential for the inputs to the mid-range and the high range amplifiers. That portion of the potential which appears between variable tap 60, on resistor R4, and ground provides the input to the high frequency power amplifier 62. The adjustment of tap 60 provides a means for balancing the output of the high frequency channel with respect to the mid-range channel.

Amplifiers 54, 58 and 62 are preferably of the type A2, shown in detail in FIG. 4. The resistors R5 and R6 in the inputs to the low frequency and mid-range power amplifiers are for signal isolation and impedance balance purposes while the resistors R7 are in the overall circuits which provide the tight control of the output signals of amplifier 54, 58 and 62 in spite of the counter e.m.f. generated by each of the associated loudspeakers. The overall voltage feedback provided by R7 is effective to provide a low output impedance for amplifiers 54, 58 and 62.

It has been found that the signal isolation and impedance balance provided by R5 and R6 is necessary for the best operation of the circuit. Resistors R6 are provided to isolate the feedback signals by way of resistors R7 from the respective junctions 52 and 55. Resistors R5 are provided for signal isolation and to substantially balance the input impedance of the non-inverting inputs of amplifiers 54 and 58 with respect to the inverting input. Capacitors C5 also assists in such balance.

The signals from junction 52 and junction 55 are inputs to the inverting inputs of the differential amplifiers 54 and 58 respectively. The input signal to high frequency amplifier 62 is from tap 60 to the non-inverting input of amplifier 62. Although amplifier 62 may be of the same construction as the amplifiers 54 and 58 the input signal is not a differential signal and therefore is connected to one of the two inputs of amplifier 62. The connection may be to either input. The resistors R8 and R9 connect the respective inputs of amplifier 62 to ground.

It will be recalled that tap 60 on resistor R4 provided the necessary gain control of the high frequency channel with respect to the mid-range channel. Gain control of the low frequency channel with respect to the mid-range channel will now be described. The input from junction 52 is connected by way of resistor R6 and resistors R30 and R31 to ground. The inverting input of amplifier 54 is then obtained from tap 53, on resistor R30. By adjusting tap 53 the ratio of the feedback voltage by way of resistor R7 is changed and hence the gain of the low frequency amplifier 54 is changed with respect to the mid-range. It has been found that with an appropriate choice of the overlapping region for the high and mid-range component signals and the overlapping region for the low and mid-range component signals, the gain controls fro the high frequency amplifier and the low frequency amplifier become, respectively, the treble and bass controls. These controls provide a function similar to the conventional treble and base tone controls.

Amplifiers 54, 58 and 62 have their outputs connected directly to one terminal of the respective low, mid-range and high frequency loudspeakers 70, 72, and 74, respectively. The other terminal of each of those loudspeakers is shown connected directly to ground. If preamplification is desired, the input signal to the frequency dividing network 50 may be obtained from the output of a preamplifier 14 on line 16 as shown in FIG. 1 instead of line 12 from the transducer 10 as shown in FIG. 2.

The type of frequency dividing network 50 shown in FIG. 2 can, of course, be used to supply a two channel system instead of using the frequency dividing network of FIG. 1. One method is to remove resistor R3, capacitor C4 and components associated with the mid-range amplifying channel. Then the top of resistor R4 would be connected to junction 56 and amplifiers 54 and 62 will perform the same functions as amplifiers 34 and 38 of FIG. 1.

Another method of using the frequency dividing network 50 of FIG. 2 for a two channel loudspeaker system is to physically connect the outputs of the amplifiers 58 and 62 together and apply the combined output to loudspeaker 22 of FIG. 1. A modification of this method is to use operational type amplifiers in place of amplifiers 58 and 62 and have their outputs resistively coupled to an input line 40 of amplifier 38 of FIG. 1. With this method the advantages of tone control by varying the gain of amplifiers 54 and 62 are maintained.

The following are exemplary of the values which are derived for the circuit elements of FIG. 2 when it is used as a three channel system and the overlapping frequency regions are centered around a nominal 400 hz and 5,000 hz:

| Resistors | Ohms |
|---|---|
| R3 and R4 | 10K |
| R5, R6, R8 and R9 | 47K |
| R7 | 470K |
| R10 | 15K |
| R30 | 10K |
| R31 | 39K |

| Capacitors | Microfarads |
|---|---|
| C3 | 0.05 |
| C4 | 0.0047 |
| C5 | 0.000033 |

In FIG. 3 the circuit of amplifier A1 is shown in a form suitable for use as amplifier 34 and 38 of FIG. 1. The noninverting input line 80 is connected through resistor R11 to the noninverting input of differential amplifier A2. Resistor R11 serves to prevent the amplifier A1 from loading down the RC crossover network 18 in FIG. 1.

The inverting input line 82 connects to the junction between resistors R12 and R13. The other terminal of R12 connects to the noninverting input line of amplifier A2 while the other terminal of R13 connects to what is normally the inverting input line of differential amplifier A2. When line 82 is grounded, as in FIG. 1, the amplifier A1 does not have a differential input signal.

Amplifier A2 has an overall feedback circuit like that shown in FIG. 2. It includes resistor R7 which connects the output line 84 to the inverting input lead of amplifier A2.

The preferred component values for FIG. 3 are:

R11 = 47,000 ohms

R12 and R13 = 47,000 ohms

R7 = 820,000 ohms

One form of the differential amplifier A2 is shown in FIG. 4 where the noninverting input on line 88 and the inverting input on line 90 are connected to terminals 3 and 2, respectively, of an integrated d.c. operational type amplifier A3 which in this example is a Fairchild type 741C. The output from amplifier A3 at terminal 6 is connected in a local feedback loop to the inverting input line 90 by way of capacitor C7 to tailor the frequency response of amplifier A3.

A positive 16 volt supply is provided at terminal 7 of amplifier A3 on line 92 and is regulated by the zener diode 94 which also serves as an infinite capacity filter for the 16-volt supply.

A negative 16-volt supply is provided at terminal 4 from line 96 which is regulated by zener diode 98, similar to 94.

The 16-volt negative supply from line 96 is connected to the tap of the resistor R15 which connects terminals 1 and 5 of amplifier A3 for adjusting the zero potential at the amplifier output.

The +16-volt and −16-volt supplies are derived from the +40- and −40 volt supplies on lines 100 and 102, respectively, by way of resistors R16 and R16′.

The output of the amplifier A3 is supplied by way of resistors R17 and R17′ to a pair of complementary driver transistors T1 and T2, where T1 is an NPN type and T2 is a PNP type. Resistors R18 and R18′ connect the emitter electrodes of the respective driver transistors T1 and T2 to the circuit common or ground, as shown.

An adjustable resistor R19 is connected between the bases of transistors T1 and T2. The resistor R19 in conjunction with resistors R20 and R20′ serves to provide an adjustment of the bias current of the transistors T1 and T2 for a smooth transition from class A operation to class B operation of driver transistors T1, T2 and power output transistors T3–T6.

R21 and R21′ are collector load resistors for transistors T1 and T2 respectively. The output of transistor T1 is connected to the input of power output transistors T3 and T5 by way of isolating resistors R22 and R23 just as the output of transistor T2 is connected to the input of power output transistors T4 and T6 by way of isolating resistors R22′ and R23′.

Each of the emitter electrodes of the power output transistors connects to the respective potential supply lines 100 and 102 by way of a series connected current limiting resistor which has a resistance that varies with the current through it. In FIG. 4 these resistors are the filaments of incandescent light bulbs I1 and I2 connecting line 100 to the emitters of T3 and T5, respectively. Also light bulbs I1′ and I2′ connect line 102 to the emitters of T4 and T6, respectively. By virtue of the increased resistance presented by each light bulb when the output transistors are overdriven the audio output of the amplifier will distort somewhat but will not break up as would be the case if the resistance in the output was fixed.

The collectors of transistors T3 and T5 are directly connected to the output line 110 as are the collectors of transistors T4 and T6.

From line 110 an internal feedback path is provided to the emitter electrodes of transistor T1 and T2 by way of the resistors R24 and R24′ respectively.

The values of the components of amplifier A2 of FIG. 4 may be as follows:

| Resistors | ohms |
|---|---|
| R15 | 10K |
| R16 and R16′ | 2.7K |
| R17 and R17′ | 4.7K |
| R18 and R18′ | 47 |
| R19 | 10K |
| R20 and R20′ | 47K |
| R21 and R21′ | 680 |
| R22 and R22′ | 47 |
| R23 and R23′ | 47 |
| R24 and R24′ | 470 |

| capacitors | picofarads |
|---|---|
| C7 | 22 |

| Transistor | type |
|---|---|
| T1 | Motorola 2N5191 |
| T2 | Motorola 2N5194 |
| T3 and T5 | Motorola 2N5195 |
| T4 and T6 | Motorola 2N5192 |
| I1, I1′, I2, and I2′ | GE type 1004 |

What is claimed is:

1. In an audio frequency reproduction system of the type which produces sound waves in three adjacent frequency ranges from three separate loudspeakers in response to an audio frequency signal the combination comprising a frequency dividing network connected to respond to said signal, said network including a capacitor and a resistor in a first series circuit connected to receive said signal and a capacitor and resistor in a second series circuit connected across the resistor of said first series circuit, a differential amplifier connected across the capacitor of said first series circuit to amplify the low frequency component signal for energizing the low frequency loudspeaker, another differential amplifier connected across the capacitor of said second series circuit to amplify the middle frequency component for energizing the mid-range loudspeaker, and an amplifier connected across at least a portion of the resistor of said second series circuit to amplify the high frequency component signal for energizing the high frequency loudspeaker.

2. An audio frequency reproduction system as set forth in claim 1 in which the differential amplifier connected to amplify the low frequency component signal is a direct coupled amplifier.

3. An audio frequency reproduction system as set forth in claim 1 in which all of said amplifiers are direct coupled differential amplifiers each having a d.c. feedback path connecting the output of the amplifier to its inverting input through a feedback resistor and the circuit of the inverting input of said amplifier includes an isolating resistor for isolating the feedback signal from the frequency dividing network.

4. An audio frequency reproduction system as set forth in claim 3 in which each of the output stages of said amplifiers includes a series connected current limiting resistance in its output current path which increases its resistance value as the output current exceeds that predetermined value which will tend to overload the output stage so that the distortion due to overload is reduced.

5. An audio frequency reproduction system as set forth in claim 3 in which the input circuit to the inverting input of the amplifier for the low frequency component signal includes resistive coupling to ground from its isolating resistor with the inverting input being obtained from an adjustable tap on said resistive coupling to provide the desired tonal balance between the loudspeaker outputs in the several frequency ranges.

6. An audio frequency reproduction system as set forth in claim 1 which includes a variable tap for modifying the portion of the resistor in said second series circuit across which the amplifier for amplifying the high frequency component signal is connected for selectively varying the signal level of the high frequency component with respect to the middle frequency component signal.

and in which the connecting path of the differential amplifier across the capacitor of the first series circuit which supplies an input signal to the inverting input of the amplifier includes a. a resistor connecting said input to ground, b. a variable tap on said resistor, and c. means connecting said variable tap to the inverting input of said differential amplifier whereby adjustment of said tap varies the signal level of the low frequency component signal with respect to the middle frequency component signal.

7. In an audio system of the type which produces sound waves in adjacent frequency ranges from separate ones of a plurality of loudspeakers in response to an audio frequency signal, the combination comprising a frequency dividing network responsive to said audio frequency signal so as to divide the audio frequency signal into separate component signals in adjacent frequency ranges having complementary frequency characteristics in the overlapping frequency regions, said frequency dividing network including, a first series circuit including a first capacitor and a first resistor; and a second series circuit including a second capacitor and a second resistor with the second series circuit being connected across said first resistor;

a loudspeaker for each of said component signals, and means connecting each of said component signals produced by the frequency dividing network to a corresponding loudspeaker, the connecting means for the low frequency loudspeaker being a differential amplifier connected across said first capacitor and having a non-reactive output circuit, the connecting means for the mid-range loudspeaker being a differential amplifier connected across said second capacitor, and the connecting means for the high frequency loudspeaker being an amplifier connected across said second resistor.

8. In an audio system of the type which produces sound waves in adjacent frequency ranges from separate ones of a plurality of loudspeakers in response to an audio frequency signal, the combination comprising a frequency dividing network responsive to said audio frequency signal so as to divide the audio frequency signal into separate component signals in adjacent frequency ranges having complementary frequency characteristics in the overlapping frequency regions, said frequency dividing network including a series circuit having a first and second resistor with a capacitor connected therebetween to provide for two frequency ranges, a loudspeaker for each of said component signals, and amplifier means connecting each of said component signals produced by the frequency dividing network to a corresponding loudspeaker, the amplifier connecting the low frequency component signal to the low frequency loudspeaker having a non-reactive output circuit and being connected between the junction of said capacitor and said first resistor and the side of said second resistor away from said capacitor, and the amplifier connecting the high frequency component signal to the high frequency loudspeaker being connected across at least a portion of said second resistor with one connection being made to the side of said second resistor away from said capacitor.

9. An audio system for producing from an audio frequency signal a plurality of separate component signals in adjacent frequency ranges so that each signal is operable to energize a separate loudspeaker comprising, a series circuit having a resistor and a capacitor to form a frequency dividing network responsive to said audio frequency signal for dividing said audio frequency signal into component signals in adjacent frequency ranges, a differential amplifier having its differential inputs connected across said capacitor for connecting one component signal to a corresponding loudspeaker, said differential amplifier having a non-reactive output circuit, and an amplifier connected across at least a portion of said resistor for connecting another component signal to a corresponding loudspeaker.

* * * * *